No. 637,032. Patented Nov. 14, 1899.
S. A. RHODES.
RETINOSCOPE.
(Application filed Aug. 9, 1899.)
(No Model.) 2 Sheets—Sheet 1.
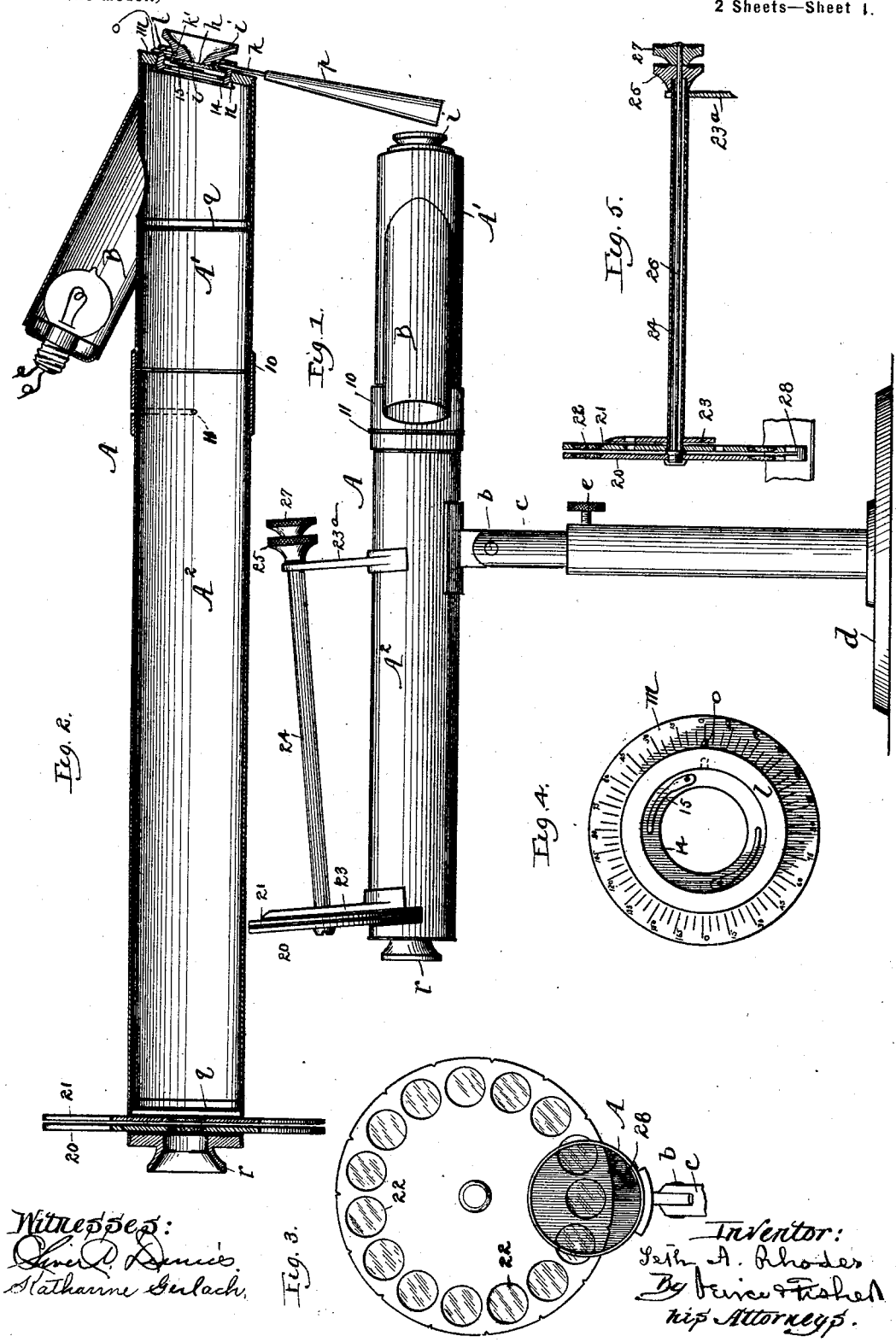

No. 637,032. Patented Nov. 14, 1899.
S. A. RHODES.
RETINOSCOPE.
(Application filed Aug. 9, 1899.)
(No Model.) 2 Sheets—Sheet 2.
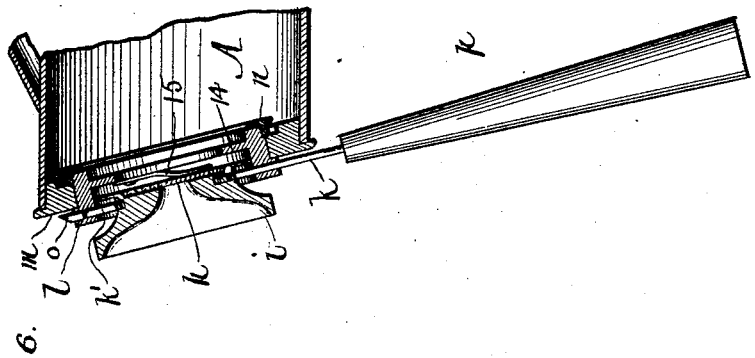
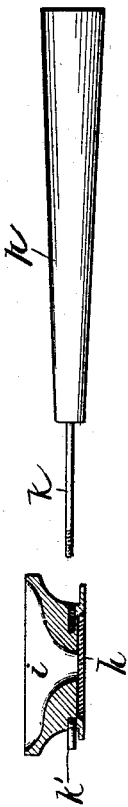

UNITED STATES PATENT OFFICE.

SETH A. RHODES, OF CHICAGO, ILLINOIS, ASSIGNOR TO THE GENEVA OPTICAL COMPANY, OF SAME PLACE.

RETINOSCOPE.

SPECIFICATION forming part of Letters Patent No. 637,032, dated November 14, 1899.

Application filed August 9, 1899. Serial No. 726,638. (No model.)

*To all whom it may concern:*

Be it known that I, SETH A. RHODES, a resident of Chicago, county of Cook, State of Illinois, have invented certain new and useful Improvements in Retinoscopes, of which the following is a full, clear, and exact description.

The invention relates to that type of instrument known as "retinoscopes" used by oculists and others in making the "shadow test" for detection of refractive errors in the eyes of a patient.

The invention seeks to improve various structural details in retinoscopes having the general organization of parts set forth by Letters Patent No. 627,011, dated June 13, 1899.

On the drawings, Figure 1 is a view of the improved instrument in side elevation; Fig. 2, a view in longitudinal central section; Fig. 3, a view in elevation at the lens-disk, the patient's eyepiece being removed; Fig. 4, an elevation detail of the graduated socket-piece and of the ring-frame carried thereby; Fig. 5, a detail view, in longitudinal section, showing the lens-disks and the control mechanism therefor; Fig. 6, an enlarged longitudinal section view at the operator's end of the instrument; Fig. 7, a section view of the mirror-disk with its actuating-handle detached.

In common with the prior structure focal tube A is united at a slight angle with the light-supply tube B and is pivotally supported, as at $b$, to the movable leg $c$, socketed adjustably by pinch-screw $e$ in the sleeve of base-stand $d$.

Focal tube A instead of being in one piece, as before, is here shown divided near the front or operator's end into two parts A' A². The front section A' of the tube carries the light-supply tube B and has a sleeve 10 brazed thereto to snugly overlap the joint between the two sections A' A². Pin 11 projects from section A² into a circular slot cut in sleeve 10, the slot being of proper length to allow section A' to be axially rotated for a distance equal to one-half turn—*i. e.*, a distance of one hundred and eighty degrees. The result of such rotation is to shift light-supply tube B from a position at the right of the operator, as shown by Fig. 2, to reverse position at his left, as shown in Fig. 1. By reason of the shift the light-supply tube and its adjuncts are quite removed from the field of vision of the free eye of the patient—that is, if the patient's right eye applied at end piece $r$ is undergoing examination it is important that the free or left eye shall enjoy an unobstructed view directly forward; but this may not occur should the light-tube B then stand projected, Fig. 2, as an obstacle at the operator's end of the focal tube. The turn half-way about, as in Fig. 1, removes light-tube B wholly from the field and allows the patient to look with his free left eye straight ahead. When the right eye is free and the patient's left eye is being examined, the light-tube B will be reversed to position shown by Fig. 2.

The extent of rotation of tube-section A' is generally one hundred and eighty degrees, but can be greater or less. Rotation through one hundred and eighty degrees is preferred, as will appear later, because the graduated scale at the operator's end is marked in reverse duplicate, and at either extreme position of tube-section A' the scale always affords like reading with equal facility.

By rotating only section A' (together with light-tube B) at the operator's end of the focal tube, while section A² at the patient's end remains stationary, it is obvious that the lens-disks there located stay undisturbed and adjusted for symmetric test of either eye in turn. The lens-disks always stand above the level of the patient's eye, and thus the disks are free from any chance contact with his nose. Neither of these advantages exists in the prior form of retinoscope wherein the whole focal tube is turned bodily about through its sustaining-band carried by adjustable leg $c$ of stand $d$.

At the operator's end focal tube A is closed by the annular socket or plug $m$, affixed thereto, as usual, and provided with ring-frame $l$, nicely fitted to turn in said socket. Keeper $n$, threaded to ring $l$, retains it in place, but still allows the ring to turn within the hole of socket-piece $m$.

Ring $l$ is furnished with an annular inturned ledge or lip 14, to which are oppositely riveted the dual springs 15. The free ends of the light-springs project barely above the plane of ledge 14 to contact with the inner face of disk $i$, expanded conically, as appears, to constitute an eyepiece for the operator. Silvered mirror $h$, with central peep-hole, is fastened across disk $i$, said disk being pivotally mounted in ring-frame $l$ by means of pintle $k'$, which projects from the disk into a hole in the frame at position in diametric line with the pointer $o$ on the outer edge of said frame.

By slightly inclining disk $i$ its pintle $k'$ can be slipped into the hole therefor and the disk be allowed to come to a snug seat within ring-frame $l$, the rear edge of said disk then resting against springs 15. Pintle-terminal $k$ of handle $p$ may now be smoothly thrust through a hole in ring-frame $l$ (within which hole the pintle journals) and the pintle be screwed at its end into the socket on eyepiece or disk $i$. The two "pintles" $k\ k'$, as the name implies, serve as pivots at diametric position and through the medium of handle $p$ permit the disk $i$, together with mirror $h$, to be rotated by the operator back and forth as desired (in ring $l$) against the slight stress of springs 15, which latter tend always to restore the disk and mirror to normal.

The tilting of the mirror is an essential feature of the retinoscope, without which the shift of the shadow across the retina of the patient's eye would not arise. The reaction-springs assist the operator by readily fixing a normal from which the tilt of the mirror (repeated innumerable times) may proceed in either direction.

The effective use of the mirror in defining the shadow depends in measure upon the relaxed expansion of the eye under observation. Such expansion most easily ensues when the patient's free eye is directed straight to a distant object; but this cannot well occur if the light-tube projects as an obstacle in the line of vision. Hence the dependence of the tilting mirror in its interplay upon the coöperative function of the focal tube in removing the obstacle from view.

If a rotary shift be given to handle $p$ about focal tube A as an axis, the handle will turn disk $i$ (together with mirror $h$) and also ring-frame $l$ in unison within the annular socket $m$. This brings the parts into new position, as will be denoted by pointer $o$, acting in conjunction with the graduated scale on socket or plug $m$. The scale is graduated in reverse through one hundred and eighty degrees for each half of the circuit. Hence if section A' of the main focal tube should be turned half about, as already explained, to remove the light-supply tube and its adjuncts from the field of view of the patient's free eye the operator needs merely to re-mark the location of pointer $o$ and (after tube-section A' has been turned) reset the pointer at the like degree on the reverse scale. The mirror, disk, and ring-frame will thereupon be restored to the same position occupied before tube-section A' was reversed. The handle $p$ is thus always within easy reach for delicate manipulation of the mirror in tilting it back and forth as necessary for study of the shadow at the eye of the patient.

Just in front of the patient's eyepiece $r$ the main focal tube is slit crosswise to admit the lens-disks 20 21, each of which is furnished with a battery of lenses 22 of various sphericity to suit the needs of the operator. The disks fit snugly within the slit and are mounted concentrically, so that any pair of lenses at the two disks can be brought to coincide in line with the center of eyepiece $r$. The two disks are capable of rotation independently of each other. Brackets 23 23$^a$, secured to the main tube A, afford journal-supports for the hollow tube or sleeve 24, fastened at one end to disk 21 and at the opposite furnished with a thumb-nut 25, by means of which the sleeve, and in consequence the disk, can be shifted at will. Through thumb-nut 25 and tube 24 extends the rod 26, which serves to sustain companion disk 20 and at its opposite terminal carries thumb-nut 27 for ready adjustment.

Bifurcated spring 28, secured to the patient's eyepiece $r$, projects into the path of disks 20 21 and engages at intervals with the notched rims thereof to hold either disk stationary despite the movement of the other, which may then be progressing. Adjusting-nuts 27 25 are brought within handy reach of the operator, and being conveniently located directly above the supporting-leg $c$ and the base-stand $d$ can be freely manipulated without disturbing the set of the focal tube at its pivot $b$.

The patient's eyepiece $r$ is of the familiar sort seated within the end of tube A, while diaphragms $q$ may be arranged, as usual, at proper points within the tube to admit the central pencil of light and to mask the dispersed rays.

Details can be varied according to the mechanic's skill without essential departure from the invention.

Having thus described my invention, what I claim as new, and desire to secure by Letters Patent, is—

1. In retinoscopes, the combination with the stationary section of the focal tube having cross-slot on its upper side, of the rotatable section of said tube having the light-tube projected at an angle therefrom, the tilting mirror extended across such rotatable section and the transverse disk with plural lenses therein, said disk being mounted within said cross-slot and permanently above the stationary section of the focal tube free from contact with the patient's face, substantially as described.

2. In retinoscopes, the combination with the focal tube and its annular socket, of the ring-frame rotatably mounted in said socket, and having an inturned ledge, the mirror-disk secured by pintles to obstruct and rock in said frame and the cushion-springs interposed between said disk and the frame-ledge to yieldingly sustain the mirror at normal, substantially as described.

3. In retinoscopes, the combination with the focal tube having cross-slot therein, of the independent operating-rods sleeved together and mounted lengthwise on said tube and the companion lens-disks fastened to said rods respectively, in concentric, adjacent relation so as to project within such tube-slot, substantially as described.

SETH A. RHODES.

Witnesses:
JAMES H. PEIRCE,
ALBERTA ADAMICK.